Feb. 16, 1954   F. J. DOERR   2,669,055
FISHHOOK REMOVER
Filed June 27, 1951                    2 Sheets-Sheet 1
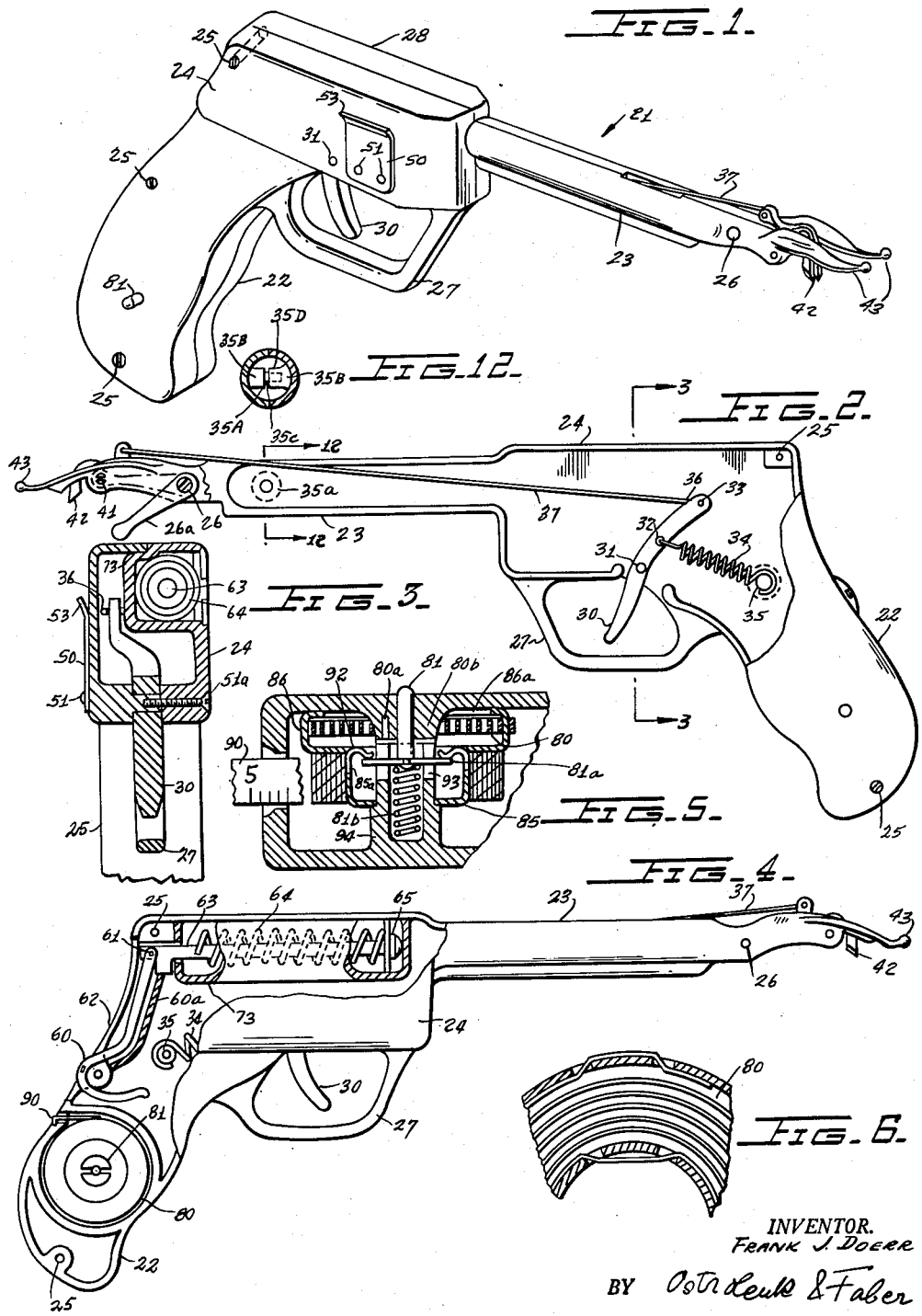
INVENTOR.
FRANK J. DOERR
BY Ostrolenk & Faber
ATTORNEYS

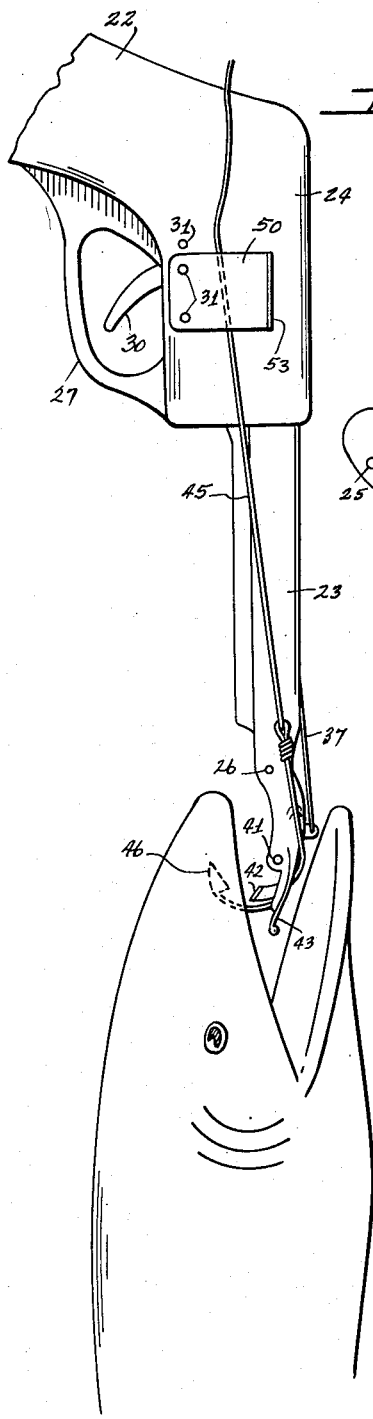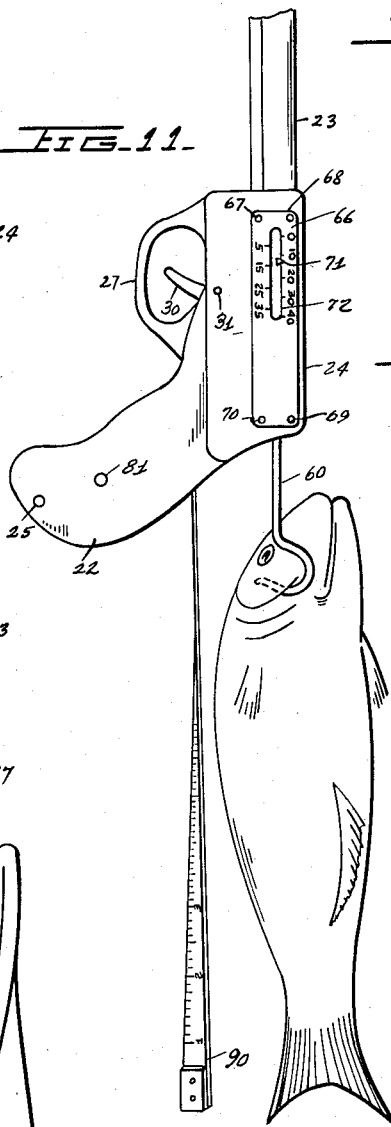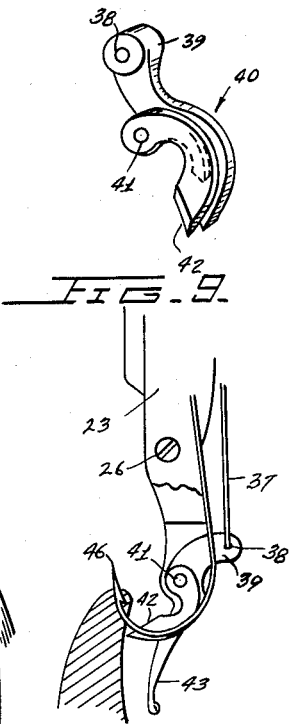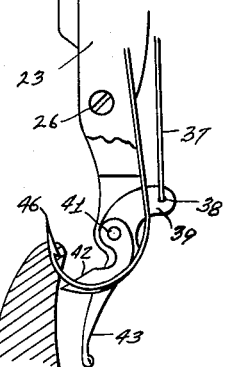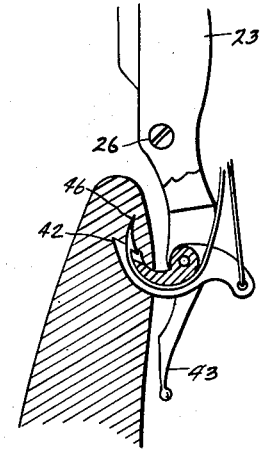

Patented Feb. 16, 1954

2,669,055

UNITED STATES PATENT OFFICE 2,669,055

FISHHOOK REMOVER

Frank J. Doerr, Richmond Hill, N. Y.

Application June 27, 1951, Serial No. 233,897

3 Claims. (Cl. 43—53.5)

My present invention relates to a tool associated with fishing and more particularly to a combination tool that can disengage the hook from the mouth of the fish, weigh the fish and measure the length of the fish.

Heretofore in the prior art, taking the fish off the hook was an unpleasant task. The hook is usually deeply embedded in the roof of the mouth of the fish. The disengaging of the hook usually requires either cutting by means of a knife or by forcefully ripping the hook out of the mouth of the fish. Both of these methods are time consuming and difficult and in addition mutilate the fish.

Moreover, in the various locales throughout the country, various fishing laws are in effect as to the length of a fish that may be caught. These laws usually specify the minimum length of fish that may be kept and so necessitate a measuring device upon the fishing scene. Some of these fishing laws specify the minimum weight of a fish that may be kept necessitating a scale for fish that are of approximately the minimum weight permitted by the law.

In carrying out my present invention I propose to provide a tool somewhat resembling in shape the figure of a gun having a trigger activating two sharpened spears for disengaging the hook from the mouth of the fish and a scale as an integral part of the handle of this gun-shaped tool for weighing the fish and a measure as an integral part of this gun-like tool to determine the length of the fish.

It is then the primary object of my present invention to provide a tool that disengages the hook from the mouth of a fish in a simple and convenient manner.

Another object of my present invention is the provision of a novel tool that disengages the hook from the mouth of the fish, weighs the fish and measures the length of the fish.

Still another object of my invention is the provision of a novel tool which essentially eliminates mutilation of the fish upon the disengagement of the hook.

Still another object of my present invention is the provision of a combined tool of a simple and economical structure which accomplishes the aforesaid objects.

Further objects and advantages will become apparent as the description proceeds in connection with the accompanying drawings, wherein:

Figure 1 is a pictorial view of the present invention.

Figure 2 is a partial cross-section with some of the components removed, of the present invention.

Figure 3 is a sectional view along line 3—3 of Figure 2.

Figure 4 is a partially sectional view of the present invention.

Figure 5 is a sectional view of a component of the present invention.

Figure 6 is a partial sectional view of a component of the present invention.

Figure 7 is a partial side view of the present invention showing its operation.

Figure 8 is a pictorial view of a component of the present invention.

Figure 9 is a partially sectional view of a portion of the present invention.

Figure 10 is a partially sectional view of a portion of the present invention.

Figure 11 is a partial side view of the present invention showing its operation.

Figure 12 is a sectional view along line 12—12 of Figure 2.

Referring now to Figure 1, the gun shaped tool 21 has a handle 22 at one end and a muzzle shaped structure 23 at the other end. The handle 22 and the muzzle structure 23 are a one piece structure together with the base 24. The handle 22, the muzzle structure 23 and the base 24 should preferably be either a non-corrosive metal or a material that is protected from the effects of moisture.

The structure comprising the muzzle 23, the handle 22 and the base 24 is made of two molded sections or die castings 28 which are held together by screws 25 and 26. The screws 25 are threaded through the handle 22, one through the base 24, and the screw 26 is threaded through a part of the muzzle structure 23.

The handle 22 and the muzzle 23 are provided with suitably threaded and reamed openings to receive and seat the screws 25 and 26.

The base 24 and the handle 22 support a trigger guard 27. The trigger guard 27 is composed of one solid piece which is a part of the molded structure 28, and surrounds a trigger 30. The trigger 30 is pivoted on a pin 31 which is a moulded portion of the base 24. As shown in Figure 2, the trigger 30 has two holes 32 and 33. One end of a restoring spring 34 is fixed to the trigger in a hole 32. The restoring spring 34 has its other end restrained about a locating pin 35. When the trigger 30 is caused to rotate in a counter-clockwise direction, the spring 34 is stretched so that when the cause of rotation is removed the trigger 30 will rotate back again to its normal position.

The muzzle 23 carries a locating pin 35A similar to locating pin 35 shown more particularly in Figure 12. Each moulded half 28 carries as an integral part thereof a moulded portion 35B. One of the moulded portions 35B has a setting pin 35C and the other a setting opening 35D which position the two moulded halves 28.

As shown in Figure 3, a screw 51A is positioned in the base 24 to hold the two castings 28 together through the center of the trigger 30.

The hole 33 is located near an end of the trigger 30 and is engaged by the end 36 of a rod 37. The other end of the rod 37 engages an opening 38 located in an end 39 of a rotatable cutting unit 40. The cutting unit 40 is shown more particularly in Figure 8. The cutting unit 40 is pivoted on a pin 41 and has two arcuate cutting members 42. When the trigger 30 is pulled the rod 37 moves towards the muzzle 23 causing the cutting unit 40 to rotate. The muzzle structure 23 has at its distal end two fork guides 43 to guide the fish hook to a suitable position as is hereinafter described.

The fishing tool 21 is not utilized in catching the fish. Once the fish is caught, the snell 45 of the hook 46, as shown in Figure 7, is placed between the fork guides 43 and the tool 21 is inserted into the mouth of the fish until the fork guides 43 straddle the hook 46. Care should be exercised if bait has remained on the hook to insert the fork guides 43 between the bait and the side of the fish's mouth and thus straddle the hook 46. This procedure is a simple one if the muzzle structure 23 is held vertical. With the fork guides 43 held firmly in position the snell 45 of the hook 46 is brought back alongside the side of the base 24 to a snell clamp 50. The snell clamp 50 is of a resilient material and is attached to the base 24 by means of two rivets 51. The snell 45 is pulled around the rounded side 53 of the clamp 50 and is thus held firmly in place. After the snell 45 is held in place the trigger 30 is pulled, rotating the spear leaves 42 into the hole made by the hook 46 as shown more particularly in Figures 9 and 10. Figure 9 shows the unrotated spear leaves 42 and Figure 10 shows the cutting elements 42 rotated along the sides of the hook 46. The arcuate cutting members 42 are then held in position straddling the hook 46 by the depression of the trigger 30 and the hook can easily be removed from the mouth of the fish. It may sometimes be necessary to press the trigger 30 two or three times to rotate the spear leaves 42. When the spear leaves 42 are rotated in position, the fish is no longer suspended from the hook 46 but is suspended from the inner curve of the arcuate cutting members 42.

The screw 26 described above supports a rotatable spring plate clamp 26A as shown in Figure 2 which covers the head of the pin 41. The clamp 26A maintains the pin 41 in position when in place. The pin 41 can be removed and the cutting unit 40 removed. The cutting unit 40 is made in various sizes, each one adapted to a different size hook 46. Changing the size of the hook 46 necessitates a change in the cutting unit 40 for efficient operation of the tool.

After the fish has been removed from the hook it may be weighed and measured as is hereinafter described.

If the fish is to be weighed, the muzzle structure 23 of the tool 21 is pointed vertically upward and a pivoted hook 60 is moved into a position in line with the muzzle 30. The pivoted hook 60 is pivoted at point 61. The handle 22 has an oblong opening 62 shown edgewise in Figure 4 through which the hook 60 moves. The hook 60 is positioned in the handle 22 alongside a rib 60A which is an integral part of the moulding 28. The pivot at point 61 is on a movable plunger 63 which carries a spring 64. The spring 64 is attached to the movable plunger 63 by a button 65. The other end of the spring 64 is free to move on the plunger 63. When the hook 60 is straightened and a weight is placed on it as in Figure 11, the hook 60 pulls the plunger 63 and compresses the spring 64. The movement of the plunger 63 is registered on a scale 66 shown in Figure 11. The scale is a steel plate which is riveted at 67, 68, 69 and 70 to the base 24. A pointer 71 is fixed to the plunger 63 and slides along a slot 72.

The fish still suspended on the hook 60 may have its length measured by a steel tape 90 shown in Figure 5.

The measuring device has a spring drum retainer 86 to which the outer end of clockspring 80 is attached. The other end of the clockspring 80 is attached in a slot 80A in a hub or boss 80B which is an integral part of the moulding 28.

A plate 86A covers the drum 86 and acts as a bearing about the hub 80B. Attached to the drum 86 is another drum 85 upon which the tape 90 is wound. Drum 85 is attached to the drum 86 by a plurality of prongs 85A. The prongs 85A protrude through the opening holes 86B in drum 86 and are bent to form a ratchet 92.

The pin 81 carries a ratchet arm 81A. The ratchet arm 81A fits into a slot 93 in the hub 94 so that rotation of the ratchet arm 81A is prevented. The arm 81A is restrained by a spring 81B.

When the tape 90 is pulled out, the drums 85 and 86 rotate. The ratchets 92 prevent rotation in the opposite direction. When the pin 81 is pressed in, the ratchet arm 81A becomes disengaged from the ratchets 92 allowing the tightened spring 86A to unwind, thus rewinding the tape 90 on the drum 85.

The clockspring 86 is shown in Figure 6 with its ends fixed as described above.

In the foregoing I have described my invention solely in connection with specific illustrative embodiments thereof. Since variations and modifications of my invention will now be obvious to those skilled in the art, I prefer to be bound not by the specific disclosure herein contained, but only by the appended claims.

I claim:

1. A fishhook remover for removing a barbed hook from the mouth of a fish, said remover having handle, base, and muzzle sections, comprising a fixed guide fork at the end of the muzzle section, the tines of said fork extending longitudinally in generally the same direction as the base, said guide fork being insertable into the mouth of the hooked fish to receive the bill of the hook between the tines thereof; a cutting unit comprising an arm at one end and a pair of cutting members at the other end, said cutting unit being mounted for pivotal movement between the tines of the said fork, said cutting members having an arcuate shape corresponding substantially to the shape of the hook; each of said cutting members having a free end of a cross-sectional dimension in a plane parallel to the plane of the hook at least equal to the dimension of the hook across its barb; means for rotating said cutting members from a first position to a second position where said cutting members enter the opening caused by the hook on either side of the hook and cover the barb; the fish then hanging from the cutting members and being slidable along said spear members to remove the fish readily from said hook and spear members.

2. A fishhook remover for removing a barbed hook from the mouth of a fish, said remover having handle, base, and muzzle sections, comprising a fixed guide fork at the end of the muzzle section, the tines of said fork extending longitudinally in generally the same direction as the base, said guide fork being insertable into the mouth of the hooked fish to receive the bill of the hook between the tines thereof, a cutting unit comprising an arm at one end and a pair of cutting members at the other end, said cutting unit being mounted for pivotal movement between the tines of the said fork, said cutting members having an arcuate shape corresponding substantially to the shape of the hook; each of said cutting members having a free end of a cross-sectional dimension in a plane parallel to the plane of the hook at least equal to the dimension of the hook across its barb; means for rotating said cutting members from a first position to a second position where said cutting members enter the opening caused by the hook on either side of the hook and cover the barb; the fish then hanging from the cutting members and being slidable along said spear members to remove the fish readily from said hook and spear members.

3. A fishhook remover for removing a barbed hook from the mouth of a fish, said remover having handle, base, and muzzle sections, comprising a fixed guide fork at the end of the muzzle section, the tines of said fork extending longitudinally in generally the same direction as the base, said guide fork being insertable into the mouth of the hooked fish to receive the bill of the hook between the tines thereof, a cutting unit comprising an arm at one end and a pair of cutting members at the other end, said cutting unit being mounted for pivotal movement between the tines of the said fork, said cutting members having an arcuate shape corresponding substantially to the shape of the hook; each of said cutting members having a free end of a cross-sectional dimension in a plane parallel to the plane of the hook at least equal to the dimension of the hook across its barb; means for rotating said cutting members from a first position to a second position where said cutting members enter the opening caused by the hook on either side of the hook and cover the barb; the fish then hanging from the cutting members and being slidable along said cutting members to remove the fish readily from said hook and cutting members; a spring connected to said link and drawing said cutting members to the withdrawn position; and a trigger lever connected to said link for operating said link against the bias of said spring.

FRANK J. DOERR.

References Cited in the file of this patent

UNITED STATES PATENTS

| Number | Name | Date |
|---|---|---|
| 1,728,864 | Kramer | Sept. 17, 1929 |
| 1,934,900 | Wills | Nov. 14, 1933 |
| 2,003,893 | La Pan | June 4, 1935 |
| 2,294,758 | Manske | Sept. 1, 1942 |

FOREIGN PATENTS

| Number | Country | Date |
|---|---|---|
| 79,910 | Switzerland | Jan. 16, 1919 |